United States Patent
Ross et al.

(10) Patent No.: US 6,263,401 B1
(45) Date of Patent: Jul. 17, 2001

(54) METHOD AND APPARATUS FOR TRANSFERRING DATA BETWEEN A REGISTER STACK AND A MEMORY RESOURCE

(75) Inventors: Jonathan K. Ross, Sunnyvale; Cary A. Coutant, Saratoga; Carol L. Thompson, San Jose; Achmed R. Zahir, Menlo Park, all of CA (US)

(73) Assignee: Institute for the Development of Emerging Architectures, L.L.C., Cupertino, CA (US)

( * ) Notice: Subject to any disclaimer, the term of this patent is extended or adjusted under 35 U.S.C. 154(b) by 0 days.

(21) Appl. No.: 08/940,834

(22) Filed: Sep. 30, 1997

(51) Int. Cl.[7] .................................................. G06F 9/315

(52) U.S. Cl. ............................ 711/109; 711/156; 710/57

(58) Field of Search .............................. 711/109, 132, 711/165, 172, 171, 170; 710/57, 56

(56) References Cited

U.S. PATENT DOCUMENTS

| | | | |
|---|---|---|---|
| 3,810,117 | * 5/1974 | Healey ................................. | 711/3 |
| 4,325,120 | 4/1982 | Colley et al. . | |
| 5,327,566 | 7/1994 | Forsyth . | |
| 5,398,330 | * 3/1995 | Johnson .............................. | 714/15 |
| 5,428,779 | 6/1995 | Allegrucci et al. . | |
| 5,530,870 | 6/1996 | Bruler . | |
| 5,535,397 | 7/1996 | Durante et al. . | |
| 5,564,031 | 10/1996 | Amerson et al. . | |
| 5,628,016 | 5/1997 | Kukol . | |
| 5,640,582 | 6/1997 | Hays et al. . | |
| 5,659,703 | 8/1997 | Moore et al. . | |
| 5,706,466 | 1/1998 | Dockser . | |
| 5,761,467 | 6/1998 | Ando . | |

OTHER PUBLICATIONS

"RISC systems", *Microprocessors and Microsystems*, Daniel Tabak, vol. 12, No. 4, May 1988, pp. 179–185.

"A Simple Interprocedural Register Allocation Algorithm and Its Effectiveness for LISP", *amc Transactions on Programming Languages and Systems*, Peter A. Steenkiste and John L. Hennessy, vol. 11, No. 1, Jan. 1989, pp. 1–32.

"A VLSI RISC", *Computer*, David A. Patterson and Carol H. Sequin, vol. 15, No. 9, Sep. 1982, pp. 1–21.

"Hewlett–Packard, Chapter 7 Stack Unwinding from Chapter 6 Millicode Calls", PA–RISC Procedure Calling Conventions Reference Manual (Palo Alto CA: Hewlett–Packard, 1986).

"The 32–bit PA–PISC Run–Time Architecture Document", HP–UX 10.20, Version 3.0, Hewlett–Packard Company, 1985–1997.

"64–Bit Runtime Architecture for PA–RISC 2.0", Version 3.3, Oct. 6, 1997, Hewlett–Packard Company.

* cited by examiner

Primary Examiner—Behzad James Peikari
(74) Attorney, Agent, or Firm—Blakely, Sokoloff, Taylor & Zafman, LLP

(57) ABSTRACT

A computer-implemented method and apparatus for transferring the contents of a general register, in a register stack, to a location in a backing store in a main memory are described. When transferring the contents of a general register to a location in the backing store, the invention proposes collecting attribute bits included in each general register of a predetermined group of registers in a temporary collection register. Once the temporary collection register has been filled, the contents of this register are written to the next available location in the backing store. Similarly, on the restoration of registers from the backing store, a collection of attribute bits saved in the backing register is transferred to a temporary collection register. Thereafter, each attribute bit is saved together with associated data into a general register, thereby to restore the former contents of each general register.

22 Claims, 6 Drawing Sheets

METHOD AND APPARATUS FOR TRANSFERRING DATA BETWEEN A REGISTER STACK AND A MEMORY RESOURCE

FIELD OF THE INVENTION

The present invention relates generally to the architectural state of a microprocessor. Specifically, the present invention relates to a method and apparatus for transferring data between a register stack and a backing store defined in the memory of the microprocessor.

BACKGROUND OF THE INVENTION

A register stack may comprise a number of general registers of a microprocessor, which have been designated for the storage of data required by, and pertaining to, procedures of a stored program being executed by the microprocessor. Specifically, upon execution of a particular procedure, a stack frame associated with that procedure is created within the register stack. The stack frame includes saved registers (containing variables local to relevant procedure), an activation record and a frame marker. When a procedure calls a further procedure, the called procedure in turn creates a further stacked frame on top of the stacked frame for the calling procedure. Accordingly, for a program in which a number of nested procedures are being executed, the register stack may include a corresponding number of stack frames.

A register stack accordingly allows multiple procedures to effectively share a large register file by stacking associated stack frames in on-chip registers. The call/return patterns of typical programs exhibit high call/return frequencies with small amplitudes. A register stack significantly reduces the number of stores (i.e. register saves) at procedures calls and loads (i.e. register restores) at procedure returns, and thus provide a "cache" of information pertinent to nested procedures. As processor operating frequencies are increasing faster than the access times to memory resources (e.g. RAM) are decreasing, reducing the number of memory accesses performed by a program, as a result of procedure calls and returns, provides a performance advantage. This advantage is becoming increasingly significant in view of the popularity of modular and object-oriented programming, and the use of dynamically linked libraries.

As a register stack has a limited size, it will be appreciated that in a deeply nested procedure call sequence, the capacity of the register stack may be exceeded in what is termed a "spill". In such situations, it is necessary to transfer some of the registers of previous stack frames from the register stack to a backing store in order to create capacity within the register stack. Similarly, as the register stack empties on procedure returns, it is desirable to restore registers of previous stack frames which have been stored in the backing store to the register stack. The transfer of stack frames between the register stack and the backing store may be problematic where the number of bits contained in a register of the register stack is not a multiple of the addressing scheme employed to address the memory resource where the backing store resides.

SUMMARY OF THE INVENTION

According to the invention there is provided an apparatus for transferring data from a register stack to a memory resource or storage device. The apparatus includes a temporary storage facility and transfer logic. The transfer logic transfers N bits of the contents of a first register in the register stack to a first location in the memory resource, and also transfers M bits of the contents of the first register to a first location in the temporary storage facility. When a predetermined number of data transfers between the register stack and the memory resource have occurred, the transferred logic transfers the accumulated contents of the temporary storage facility to a second location in the memory resource.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for transferring data between a register and a memory resource within an integrated circuit are described. In the following description, for purposes of explanation, numerous specific details are set forth in order to provide a thorough understanding of the present invention. It will be evident, however, to one skilled in the art that the present invention may be practiced without these specific details.

Computer System And Microprocessor Overview

Figure 1:
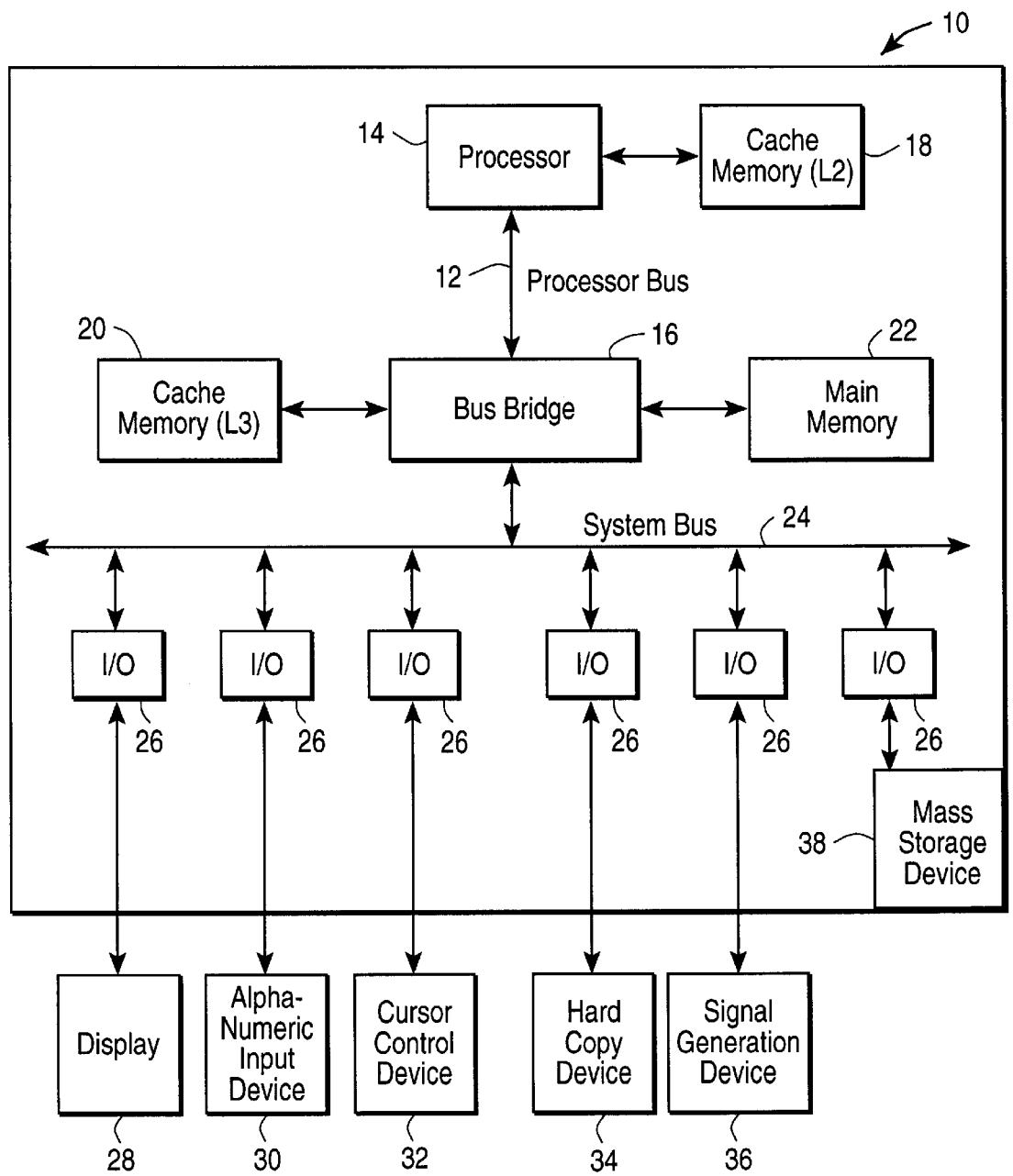
FIG. 1 is a schematic representation of a computer system in which the present invention may be implemented and exercised.

Referring to FIG. 1, an overview of a computer system 10, which may be used in conjunction with any one of the described embodiments of the present invention, is shown in block diagram form. It will be understood that, while FIG. 1 is useful for providing an overall description of a computer system, a number of details of the system are not shown. As necessary for disclosure of the present invention, further detail is set forth with reference to other figures provided with the specification. Further, the present invention is described with reference to exemplary embodiments. Alternative embodiments which may be conceived by one of ordinary skill in the art are considered within the scope of the invention. As illustrated in FIG. 1, the computer system 10 comprises a processor bus 12 for communicating information between a processor 14 and a bus bridge _16. The processor 14 is also coupled via a dedicated bus to a Level Two (L2) cache memory 18. The processor 14 communicates with the rest of the computer system 10 via the bus bridge 16, to which are coupled a Level Three (L3) cache memory 20 and a main memory 22, which is typically a Random Access Memory (RAM). A systems bus 24 is also coupled to the bus bridge 16, and which facilitates communication between a number of peripheral devices, the processor 14 and the main memory 22. A number of dedicated input/output (I/O) ports 26 are coupled between the systems bus 24 and associated peripheral devices. The peripheral devices include a display unit 28, (such as Cathode Ray Tube (CRT) or a Liquid Crystal Display (LCD)), an alphanumeric input device 30 (such as a keyboard), a cursor control device 32 (such as a mouse or other pointing device), a hard copy device 34, (such as a printer or plotter for providing visual representations of computer images), and a signal generation device 36 (such as a microphone or loudspeaker). The computer system 10 also includes a mass storage device 38, such as a magnetic disk and associated drive unit, which is coupled to the systems bus 24 via a dedicated I/O port 26.

Figure 2:
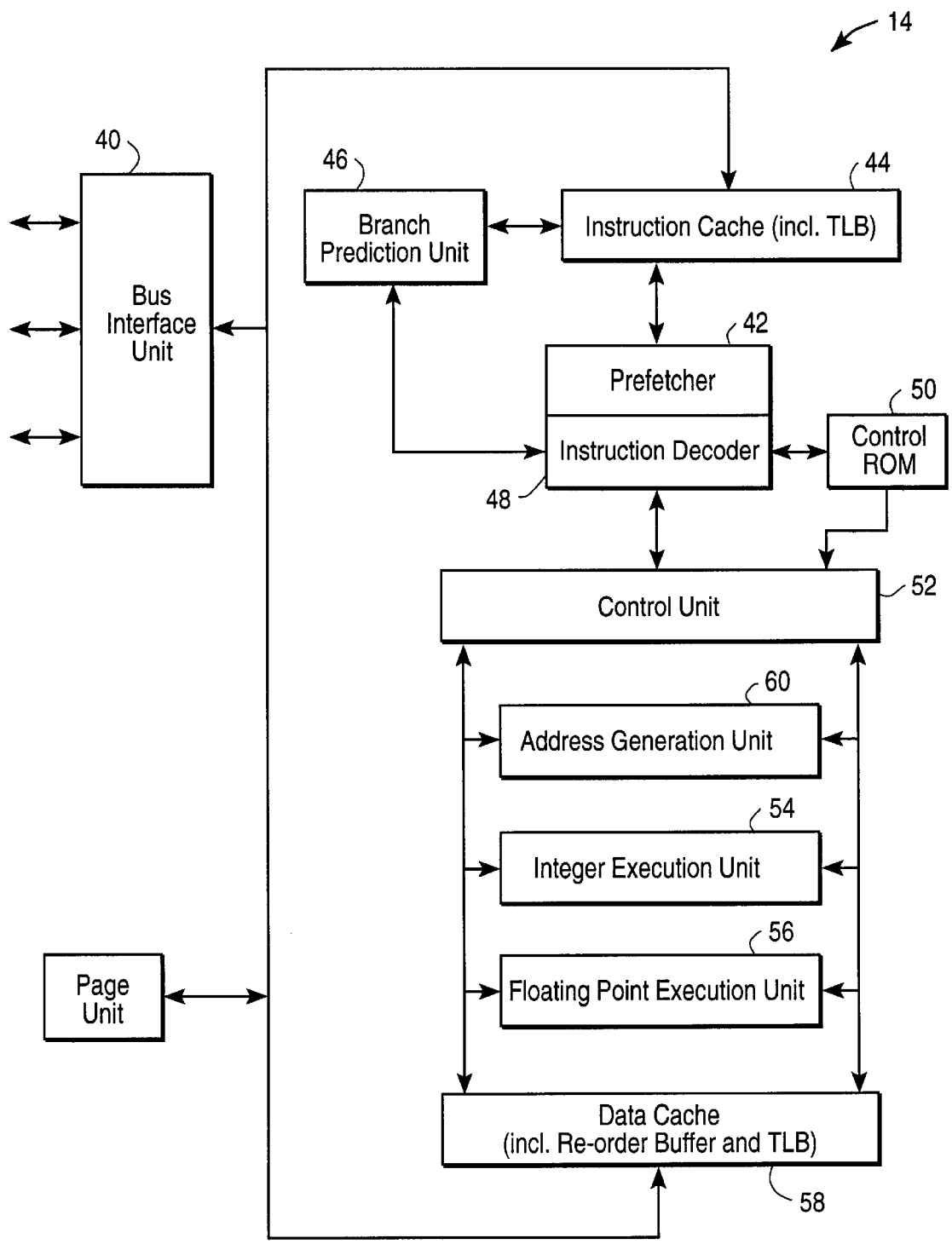
FIG. 2 is a schematic representation of a processor in which the present invention may be implemented and exercised.

Referring now to FIG. 2, a more detailed representation of the processor 14 of FIG. 1 is shown in block diagram form. The processor 14 comprises a bus interface unit 40, which provides an interface between the microprocessor 14 and the system bus 12. The bus interface unit 40 is coupled to allow a prefetcher 42 to access main memory 22 of the computer system 10 via an instruction cache 44. The prefetcher 42 retrieves instructions, indexed by an instruction pointer, from the instruction cache 44 or from main memory 22 via the bus interface unit 40. A branch prediction unit 46 provides speculative predictions for branch instructions retrieved by the prefetcher 42, and also outputs an instruction pointer, indexing either a sequential memory address or a target memory address, depending on whether a branch is predicted as being taken or not taken. In a Complex Instruction Set Computing (CISC) architecture, the prefetcher 42 propagates instructions to a decoder 48 for decoding into a set of micro-operations for down-stream processing. A control read-only-memory (ROM) 50 is coupled to the decoder 48, and receives entry-points from the decoder 48. The decoder 48 and the control ROM 50 supply micro-operations to a control unit 52 It will be appreciated that, in a Reduced Instruction Set Computing (RISC) embodiment, the instruction decoder 48 and the control ROM 50 may be omitted from the processor architecture.

The control unit 52 supplies an integer execution unit 54 and a floating point execution unit 56 with integer and floating point instructions, respectively, for execution. The integer execution unit 54 and the floating-point execution unit 56 have access to a data cache 58 when executing instructions. Micro-operations are also supplied from the control unit 52 to an address generation unit 60, which generates and translates address information.

Figure 3:
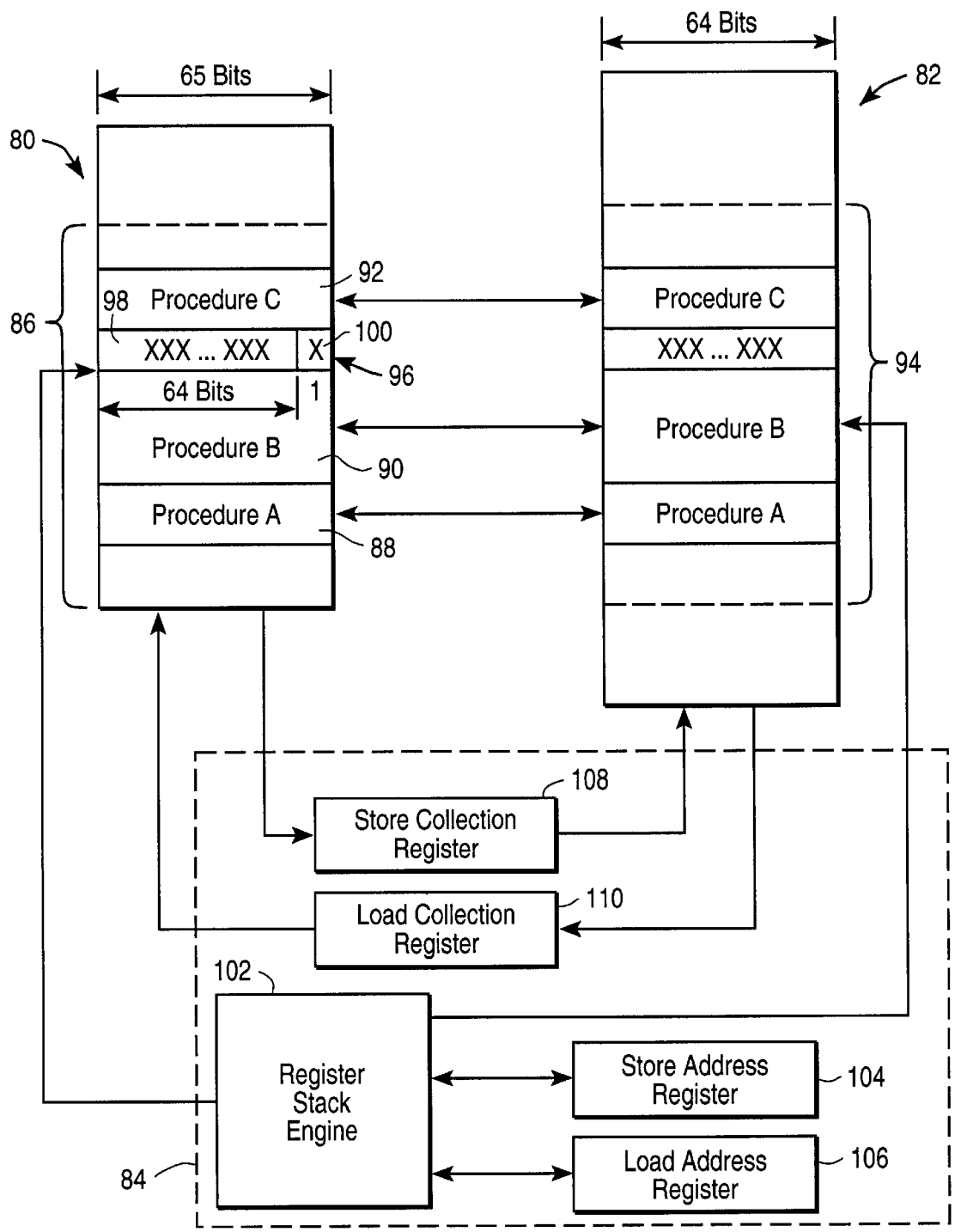
FIG. 3 is a schematic representation of apparatus, according to one embodiment of the invention, for transferring data between a register stack and a memory resource.

FIG. 3 is a schematic representation of a set of general registers 80, a main memory 82, and transfer apparatus 84, according to one exemplary embodiment of the invention, for facilitating the transfer of information between the general registers 80 and the main memory 82.

Resister Stack And Backing Store

Of the general registers, a subset thereof is designated for use as a register stack 86. For example, of 128 general registers, 96 of them may be designated as comprising the register stack 86. As a program is executing, each procedure thereof may allocate a certain number of registers in the register stack 86 as a local stack frame. Referring to FIG. 3, the register stack 86 is accordingly shown to include stack frames 88, 90 and 92, associated with procedures A, B and C respectively. Each of the stack frames 88, 90 and 92 comprises a predetermined number of registers having a specific bit-length. In the embodiment illustrated in FIG. 3, each register in the register stack has bit-length of 65 bits.

Each stack frame is automatically preserved as another procedure is called. For example, the stack frame 88 for procedure A is preserved when procedure A calls procedure B. Similarly, the stack frame 90 for procedure B is preserved in the register stack when procedure B calls procedure C. When a return from procedure occurs, the relevant stack frame is then removed from the register stack. For example, on a return from procedure C to procedure B, the stack frame 92 is removed from the register stack 86.

It will be appreciated that the register stack 86 is of a fixed and limited capacity. In the event of a large number of consecutively called procedures, the register stack 86 may have insufficient capacity to accommodate stack frames for all called procedures, and the register stack may overflow or "spill". In this situation, it becomes necessary to save some of the older stack frames to a section of main memory 82 designated as a backing store 94. In the event of the procedure call stack in the register stack 86 becoming too deep, it may thus become necessary to save some of the stack frames 88, 90 and 92 to the backing store 94, as illustrated in FIG. 3.

Similarly, as stack frames for procedures subsequent to procedures A, B and C are removed from the register stack 86, it again becomes desirable for the stack frames 88, 90 and 92 to reside in the register stack 86. Accordingly, when capacity becomes available in the register stack 86, portions of the stack frames 88, 90 and 92 can then again be incrementally transferred from the backing store 94 to the register stack 86.

Attribute Information

In advanced processor architectures, it may be desirable to associate attribute information with certain data. For example, in processors capable of speculative instruction execution, it may be desirable to defer exceptions generated by such speculative instructions until the relevant instruction becomes non-speculative. In order to implement this deferred handling of exceptions generated by speculatively-executed instructions, the embodiment of the invention illustrated in FIG. 3 proposes that each 64-bit general register 80 be augmented with a 65th bit termed an attribute bit. An exemplary register 96, is thus shown to include (64) data bits 98 and a single attribute bit 100. The attribute bit 100 is used to indicate the success or failure of a series of speculative load operations targeting the relevant register. If the load instruction to a particular memory address would have generated a fault, a speculative load instruction will set the attribute bit 100, associated with the target register, to a logical one (1). In this way, handling of the fault is deferred until a program attempts, if ever, to use the result of the load operation. Accordingly, compilers are able to issue load instructions earlier than would otherwise have been possible.

The creation of a general register having a 65-bit length, while being advantageous from an exception handling view point, may give rise to certain inefficiencies in the saving of data from the register stack 86 to the backing store 94. As main memory 82 is addressed in terms of 8-bit bytes, one method of storing the contents of a register to the backing store 94 proposes using 9 bytes for the storage of each general register. However, this would result in a wastage of seven bits per register, as the Most Significant Bit (MSB) would be the only bit occupying the final 9th byte transferred to the main memory 82. This inefficiency is exasperated when memory is addressed in terms of 16-bit bytes.

Referring specifically to FIG. 3, the transfer apparatus 84 comprises a register stack engine 102, a pair of address registers 104 and 106, and a pair of collection registers 108 and 110. The register stack engine 102 is responsible for transferring stack frames from the register stack 86 to the backing store 94 (spills), and also for transferring stack frames back from the backing store 94 to the register stack 86 (fills). The register stack engine 102 spills and fills the register stack 86 without explicit program intervention, and concurrently and asynchronously with respect to instruction execution. This allows the register stack engine 102 to take advantage of unused memory band-width to dynamically perform register spill and fill operations in a preemptive manner. For example, the register stack engine 102 can preempt a register stack 86 overflow by transferring stack frames to the backing store 94 when it anticipates a register stack overflow may occur. Similarly, the register stack engine 102 may preemptively transfer stack frames from the backing store 94 to the register stack 86 prior to the stack frame actually being required. By performing these spill and fill operations in an asynchronous manner, and using spare memory cycles, processor performance is enhanced.

The register stack engine 102 is coupled to the store and load address registers 104 and 106. The store address register 104 is a 64-bit register, and contains the address of the location in the backing store 94 into which the next 64-bit value, retrieved from the register stack 86, will be saved. The store address register 104 is used by the register stack engine 102 when saving general registers, and the address contained therein may be required to be 8-byte aligned. Similarly, the load address register 106 is a 64-bit register, and contains the address of the location (8 bytes deeper) in the backing store 94 from which the next 64-bit value will be retrieved for transfer back to the register stack 86. This address may similarly be required to be 8-byte aligned.

The store and load collection registers 108 and 110 are dedicated to the temporary storage of attribute bits 100 when data associated with these attribute bits is transferred between the register stack 86 and the backing store 94. The operation of these storage resisters 108 and 110 will be described below with reference to FIGS. 4 and 5. Each of the collection registers 108 and 110 is a 64-bit register. The store collection register 108 contains the attribute bits 100 of up to 63 of the registers most recently saved to the backing store 94. Similarly, the load collection register 100 contains the attribute bits 100 of up to 63 of the next registers to be restored.

Methodology

Figure 4:
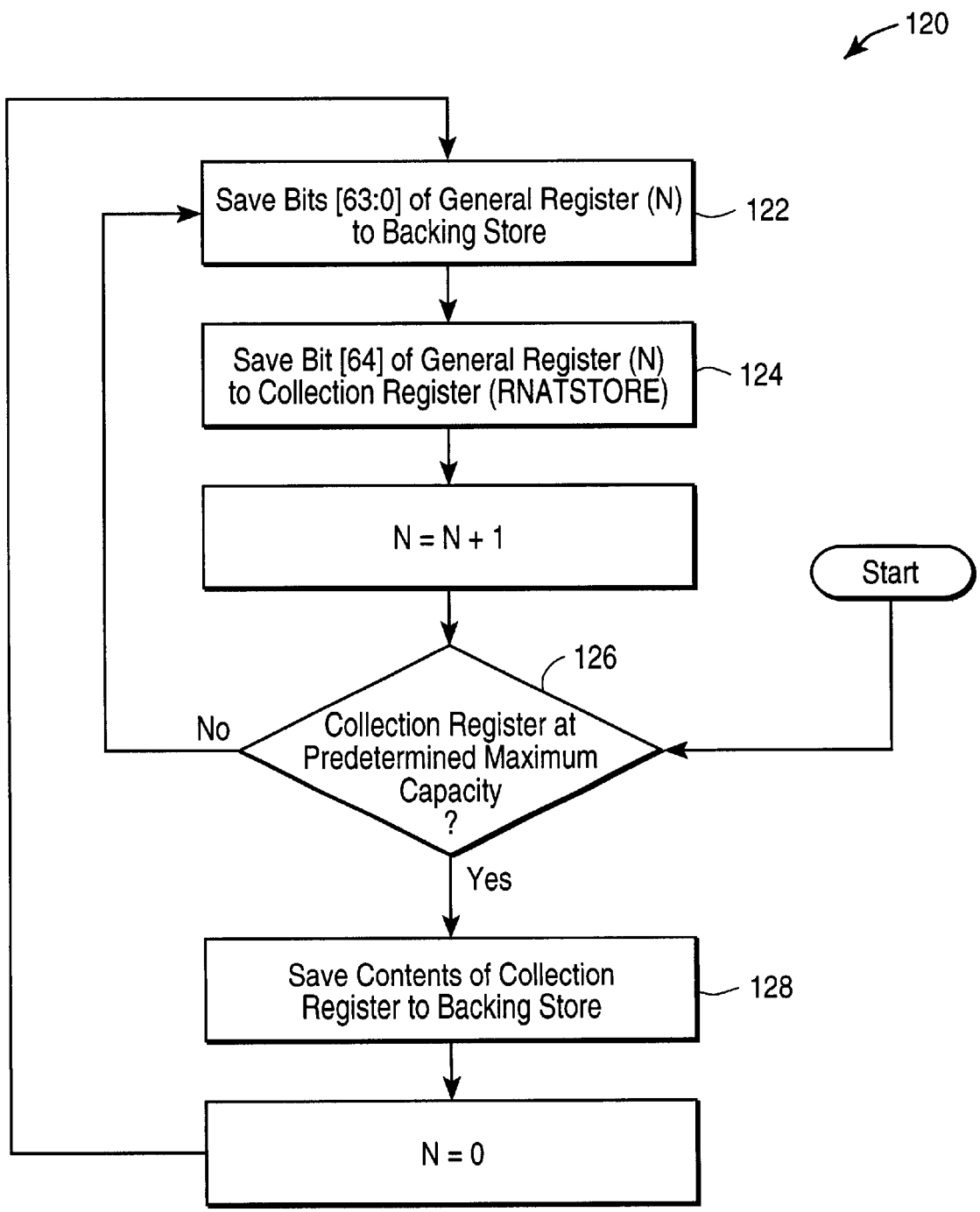
FIG. 4 is a flow chart illustrating a method, according to the present invention, of storing the contents of a register in a memory resource.

Methods by which data is transferred between the register stack 86 and the backing store 94, as performed by the transfer apparatus 84, will now be described with reference to the flow charts shown in FIGS. 4 and 5. A method 120 of storing the contents of a general register 96 to a designated location in the backing store 94, according to one exemplary embodiment of the invention, is illustrated in FIG. 4.

In summary, the exemplary method 120 proposes saving general registers to the backing store 94 in groups of sixty-three registers, and concurrently collecting the attribute bits 100 for each these registers in the store collection register 108. It will be appreciated that the invention is not limited to groups of sixty-three registers, and register groups of any size could be transferred. After each group of sixty-three general registers has been transferred to the backing store 94, the method 120 then proposes saving the collection of attribute bits 100, now contained in the register 108, to the backing store 94 as a 64-bit doubleword. More specifically, the method 120 commences at decision box 126, where a determination is made as to whether the collection register 108 has reached a predetermined maximum capacity. In the illustrated embodiment, a determination is made as to whether the collection register 108 contains 63 attribute bits. If the collection register 108 has not reached the predetermined capacity, then steps 122 and 124 are performed with respect to the sequentially next general register in the register stack 86. Specifically, step 122 requires saving bits [63:0] (i.e. data bits 98) of a general register N to the next available 64-bit location in the backing store 94. At step 124, bit [64] (i.e. attribute bit 100) of the general register N is saved to the next available location in the store collection register 108. Alternatively, should the maximum capacity of the collection register 108 have been reached, the method 120 proceeds to step 128, and the contents of the store collection register 108 are saved at the next available 64-bit location in the backing store 94. The contents of the store collection register 108 now having been emptied, the method 120 is repeated with respect to the next group of sixty-three general registers in the register stack 86.

The determination at step 126 as to whether the store collection register 108 contains the predetermined number of attributes 100 may be performed in a number of different ways. In one embodiment, a simple counter (not shown) may be provided which maintains a count of the number of register transfers between the register stack 86 and the backing store 94. In another embodiment, the register stack engine 102 may simply examine a specific sequence of bits of the address contained in the store address register 104. In the illustrated embodiment, bits [8:3] of the store address register 104 provide a count of the number of register transfers from the register stack 86 to the backing store 94. Accordingly, should the bits [8:3] in the store address register 104 not be all one's (1's), this indicates that the store collection register 108 has not reached its predetermined capacity, and that steps 122 and 124 should be performed with respect to the next sequential general register. On the other hand, should the bits [8:3] of the stored address register 104 be all one's (1's), this indicates that sixty-three attribute bits 100 have been saved to the store collection register 108, and that step 128 should be performed.

Figure 6:
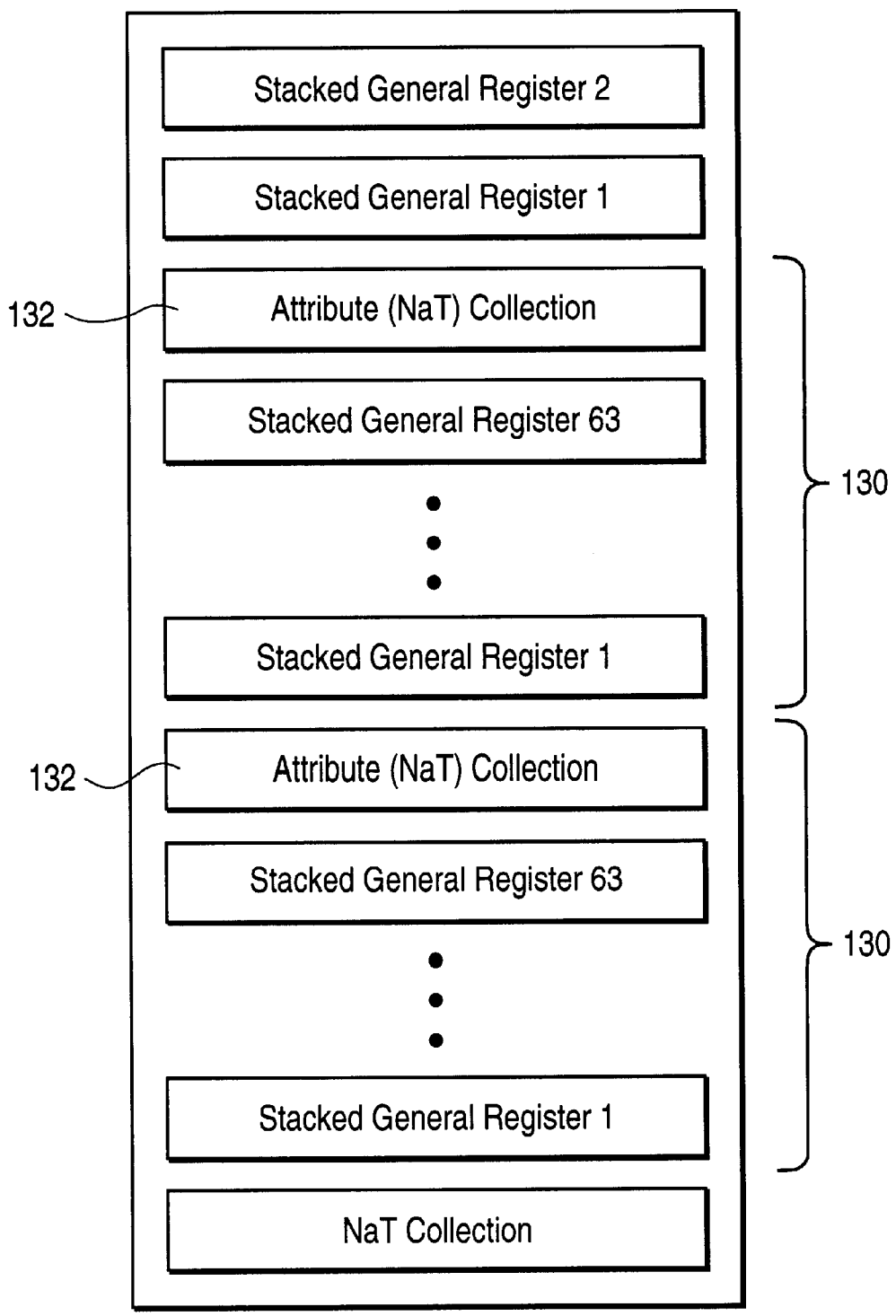
FIG. 6 is a schematic representation of a backing store, according to the present invention, as constructed in main memory.

FIG. 6 shows a more detailed view of the backing store 94, and provides an illustrative example of how batches 130 of data are stored to main memory 82. Each batch is shown to comprise the contents of a group of sixty-three general registers followed by an assembled attribute bit collection 132 comprising the attribute bits associated with the preceding general register content.

Figure 5:
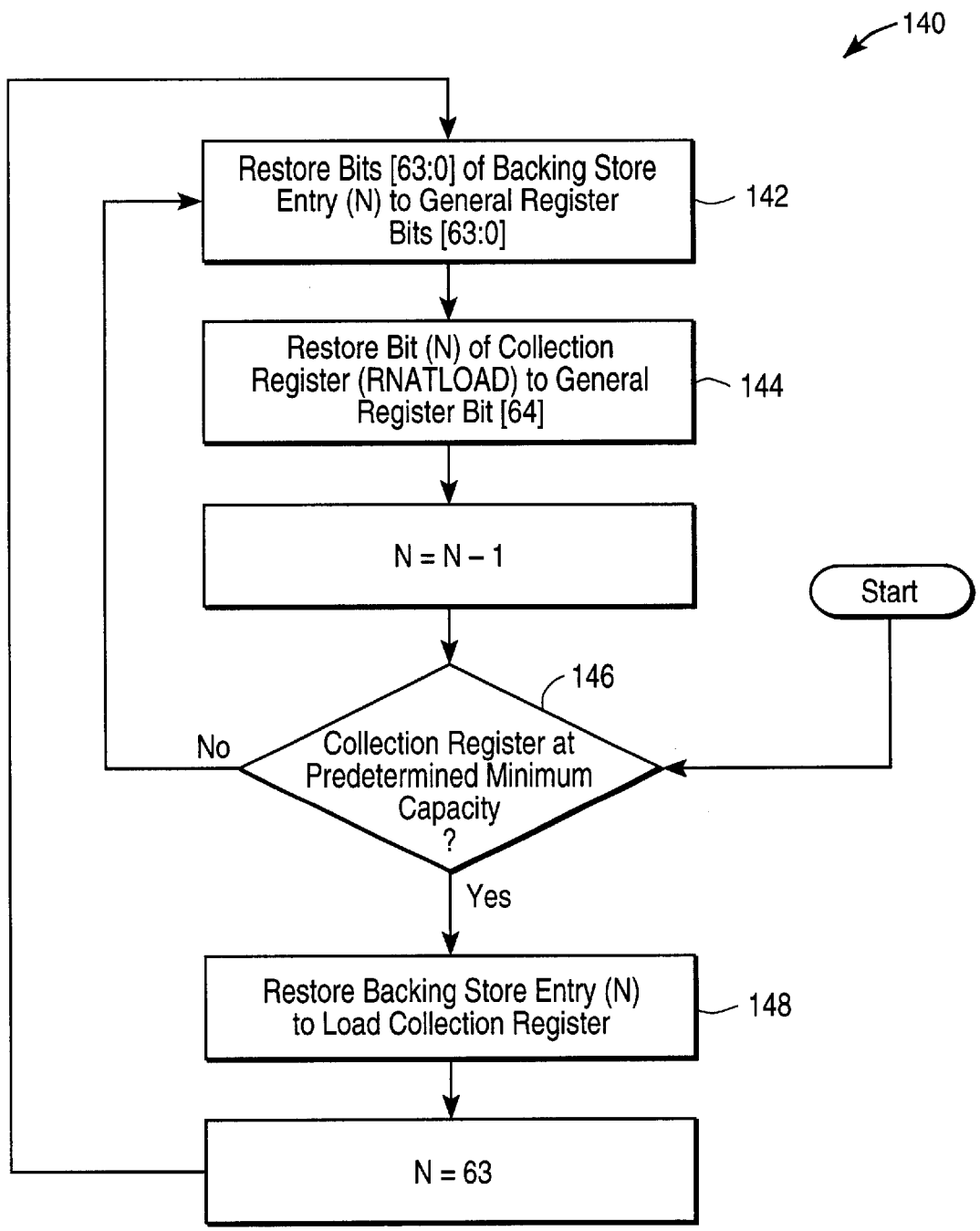
FIG. 5 is a flow chart illustrating a method, according to the invention, of restoring the contents of a register from a memory resource.

Referring now to FIG. 5, there is shown a flow chart illustrating a method 140, according to one embodiment of the present invention, of restoring the contents of a series of general registers 86 from the backing store 94 in the main memory 82. In essence, the method 140 comprises loading an attribute bit collection 132, having a bit-length of 64 bits, from a location in the backing store 94 into the load collection register 110. Thereafter, the content of each of sixty-three general registers is paired with an associated attribute bit, now contained in the load collection register 110, and the resulting 65-bit data and attribute assembly is transferred to the next available general register 96 in the register stack 86. This procedure is performed with respect to each of the sixty-three general register contents associated with the attribute bits stored in the load collection register 110. On completion of the transfer of the contents of the sixty-three general registers, the load collection register 110 is loaded with the attribute bits for the next sixty-three registers, and the above procedure is repeated. Referring now specifically to FIG. 5, the method 140 commences at decision block 146, where a determination is made as to whether all attribute bits stored in the load collection register 110 have been saved to appropriate general registers. If not, the method proceeds to step 142 and the contents of the next sequential register are restored from the backing store 94 and the load collection register 110. Specifically, step 142 requires storing bits [63:0] of a backing store entry (N) to bits [63:0] of the next 65-bit general register 96. At step 144, bit (N) (i.e. the attribute bit associated with the bits [63:0]) is saved to bit [64] of the same general register 96 to which the save was made at step 142. Accordingly, the sixty-four data bits 98 and the single attribute 100 are again assembled in a general register. as described above. On the other hand, should it be determined at decision block 146 that the load collection register 110 has been exhausted, the register 110 is then again filled, at step 148, with the attribute bit collection 132 for the next sixty-three general registers to be restored.

The determination at decision block 146 as to whether the load collection register is exhausted may be performed by reference to a simple counter, which maintains a count of the number of transfers between the backing store and the register stack. In the embodiment of the invention illustrated in FIG. 3, bits [8:3] of the load address register 106 provide a count of the number of transfers that have occurred from the backing store to the register stack. Accordingly, by referencing these bits [8:3], the register stack engine 102 is able to determine if the load collection register 110 has been exhausted. Specifically, if bits [8:3] of the load address register 106 are not all one's (1's), this indicates that the load collection register 110 has not been exhausted. Alternatively, should bits [8:3] be all one's (1's), the double word (i.e. the 64-bit attribute collection 132) at the location designated by the address in the load address register 106 is loaded from the backing store 94 into the load collection register 110. In this way, the attribute bits for the next group sixty-three registers to be restored are available in the register 110.

It could further be noted that, in one embodiment, the same mechanism which is used to determine whether the attribute collection register is full is also used to determine which bit of the attribute collection register is added to the N data bits of the restored register.

Thus, a method and apparatus for transferring data between a register and a memory resource have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of storing the contents of a register in a memory resource, the method including:

storing N bits of the contents of a first register at a first memory location in the memory resource;

storing M bits of the contents of the first register to a collection storage facility;

determining whether the collection storage facility contains a predetermined number of bits of stored information; and if the collection storage facility contains the predetermined number of bits of stored information, then storing the contents of the collection storage facility at a second memory location in the memory resource;

wherein the first register has a capacity of N+M bits, the first memory location in the memory resource has a capacity of N bits, and the predetermined number of bits of stored information comprises N bits.

2. The method of claim 1 wherein, if the collection storage facility does not contain the predetermined number of bits of stored information, then storing N bits of the contents of a second register at the second memory location in the memory resource, and storing M bits of the contents of the second register to the collection storage facility.

3. The method of claim 1 wherein the first and second memory locations are sequential memory locations in the memory resource.

4. The method of claim 1 wherein the first register comprises a general purpose register of a register stack, and the memory resource comprise a Random Access Memory (RAM).

5. The method of claim 1 wherein the collection storage facility comprises a register.

6. The method of claim 1 wherein N+M is not an integral multiple of a bus width employed by the memory resource.

7. The method of claim 1 wherein the attribute information indicates whether data comprising the N bits is valid or invalid.

8. A method of restoring the contents of a register stack from a memory resource, the method including:

storing N bits from a first memory location of the memory resource in a first register of the register stack;

storing M bits from a temporary storage facility in the first register of the register stack;

determining whether a predetermined number of bits of information from the temporary storage facility have been stored in registers of the register stack; and if so, then storing the contents of a second memory location of the memory resource in the temporary storage facility;

wherein the first register has a capacity of N+M bits, the first memory location in the memory resource has a capacity of N bits, and the predetermined number of bits of information comprises N bits.

9. The method of claim 8 wherein, if a predetermined number of bits of information from the temporary storage facility have not been stored in registers of the register stack, then storing N bits of the contents of the second memory location in the memory resource in a second register of the register stack, and storing M bits from the temporary storage facility in the second register of the register stack.

10. The method of claim 8 wherein the first and second memory locations are sequential locations in the memory resource.

11. The method of claim 8 wherein the first register comprises a general purpose register of the register stack, and the memory resource comprise a main memory of an integrated circuit.

12. Apparatus for transferring data from a register stack to a memory resource, the apparatus comprising:

a temporary storage facility; and transfer logic to transfer N bits of the contents of a first register in the register stack to a first location in the memory resource, to transfer M bits of the contents of the first register to a first location in the temporary storage facility, and to transfer the contents of the temporary storage facility to a second location in the memory resource after a predetermined number of data transfers between the register stack and the memory resource;

wherein the first register in the register stack has a bit length of N+M bits and the first location in the memory resource has a bit length of N bits.

13. The apparatus of claim 12 including a counter to maintain a count of the number of data transfers from the register stack to the memory resource.

14. The apparatus of claim 13 wherein the counter comprises an address register indexing a location in the memory resource.

15. The apparatus of claim 12 wherein N+M is not an integral multiple of a bus width employed by the memory resource.

16. The apparatus of claim 12 wherein the transfer logic is, if a predetermined number of data transfers between the registers stack and the memory resource has not occurred, to transfer N bits from the contents of a second register in the register stack to the second location in the memory resource and to transfer M bits of the contents of the second register to a second location in the temporary storage facility.

17. The apparatus of claim 12 wherein the first and second storage locations in the memory resource are consecutive storage locations.

18. Apparatus for transferring data from a memory resource to a register stack, the apparatus comprising:

a temporary storage facility; and transfer logic to transfer N bits from a first location in the memory resource, and M bits from a first location in the temporary storage facility, to a first register in the register stack, and to transfer the contents of a second location in the memory resource to the temporary storage register after a predetermined number of data transfers between the register stack and the memory resource;

wherein the first register in the register stack has a bit length of N+M bits and the first location in the memory resource has a bit length of N bits.

19. The apparatus of claim 18 including a counter to maintain a count of the number of transfers between the register stack and the memory resource.

20. The apparatus of claim 19 wherein the counter comprises an address register indexing a location in the memory resource.

21. The apparatus of claim 18 wherein N+M is not an integral multiple of a bus width employed by the memory resource.

22. The apparatus of claim 18 wherein the transfer logic is, if a predetermined number of data transfers between the registers stack and the memory resource has not occurred, to transfer N bits from the second location in the memory resource, and M bits from a second location in the temporary storage facility, to a second register in the register stack.

* * * * *